(12) United States Patent
Charlier

(10) Patent No.: US 8,337,743 B2
(45) Date of Patent: Dec. 25, 2012

(54) PROCESS FOR PRODUCING A POLYETHYLENE-POLYPROPYLENE MULTILAYER BLOWN FILM

(75) Inventor: Pascal Charlier, Evere (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 169 days.

(21) Appl. No.: 12/665,205

(22) PCT Filed: Jun. 20, 2008

(86) PCT No.: PCT/EP2008/057912
§ 371 (c)(1),
(2), (4) Date: Jun. 15, 2010

(87) PCT Pub. No.: WO2009/000783
PCT Pub. Date: Dec. 31, 2008

(65) Prior Publication Data
US 2010/0297459 A1 Nov. 25, 2010

(30) Foreign Application Priority Data

Jun. 22, 2007 (EP) .................................. 07110837

(51) Int. Cl.
*B29C 49/04* (2006.01)
(52) U.S. Cl. .................... 264/514; 264/510; 264/173.16
(58) Field of Classification Search ........................ None
See application file for complete search history.

(56) References Cited

U.S. PATENT DOCUMENTS 5,759,648 A * 6/1998 Idlas ............................ 428/34.9
5,789,029 A 8/1998 Ramsey
5,840,430 A * 11/1998 Ramsey et al. ............... 428/516

FOREIGN PATENT DOCUMENTS

| JP | 61116521 A | 6/1986 |
| JP | 61229529 A | 10/1986 |
| JP | 02294337 A | 12/1990 |
| WO | WO 97/44178 | 11/1997 |

* cited by examiner

Primary Examiner — Monica A Huson

(57) ABSTRACT

The present invention relates to a process for producing a multilayer film comprising at least one polyethylene (except high pressure polyethylene) and polypropylene layer, wherein the adhesion between the polyethylene and polypropylene is enhanced without the use of any tie layer by processing the film with a freezing time of less than ten seconds.

9 Claims, 2 Drawing Sheets

PROCESS FOR PRODUCING A POLYETHYLENE-POLYPROPYLENE MULTILAYER BLOWN FILM

CROSS-REFERENCE TO RELATED APPLICATIONS

This application claims the benefit of PCT/EP2008/057912, filed Jun. 20, 2008, which claims priority from EP 07110837.7, filed Jun. 22, 2007.

The present invention relates to a process for producing a multi-layer film containing at least one polyethylene layer and at least one polypropylene layer.

Polyethylene is widely used in film applications for its clarity, flexibility toughness, heat sealability, impact resistance, tear resistance and organoleptic properties. Typically, polyethylene is coextruded, laminated or bonded to other polyolefins such as for example polypropylene, which imparts rigidity to the film. However, it is known in the art that polyethylene does not adhere onto polypropylene without tie layer. A typical tie layer is costly and requires more complex extrusion machines.

There is thus a need for preparing films that have the general properties of the polyethylene and the good rigidity of the polypropylene by coextruding polyethylene and polypropylene without tie layers.

WO 97/44178 relates to a coextruded blown film made from at least one layer of a metallocene linear low density polyethylene and at least one layer of an impact grade polypropylene and packaging devices made from coextruded blown film.

U.S. Pat. No. 5,789,029 relates to multilayer thermoplastic stretch wrap film having substantial one-sided cling properties made without the use of polymers with high levels of n-hexane extractables, dissimilar polymer chemistries or low molecular weight tackifiers. The reverse or cling layer comprises at least one homogeneous branched ethylene polymer composition having a density of about 0.90 g/cm$^3$ or less and the obverse or non-cling layer comprises a propylene or ethylene polymer composition having a density greater than 0.90 g/cm$^3$.

It is an object of the present invention to provide a process for preparing films or sheets by coextruding polyethylene and polypropylene without tie layer.

It is another object of the present invention to enhance the adhesion between polyethylene and polypropylene.

The present invention provides a process for producing a multi-layer film containing at least one polyethylene layer adjacent to at least one polypropylene layer comprising the steps of:
a) feeding polypropylene to a first extruder of an coextrusion film unit,
b) feeding polyethylene to a second extruder of the coextrusion film unit,
c) coextruding the polypropylene and the polyethylene through a die to form a molten extrudate,
d) blowing the molten extrudate into a film,
e) cooling the film to form a multi-layer film,
characterised in that the freezing time of the extrudate is less than 10 seconds and with the proviso that the polyethylene is not a low density polyethylene produced by a high pressure polymerisation process.

Figure 1:
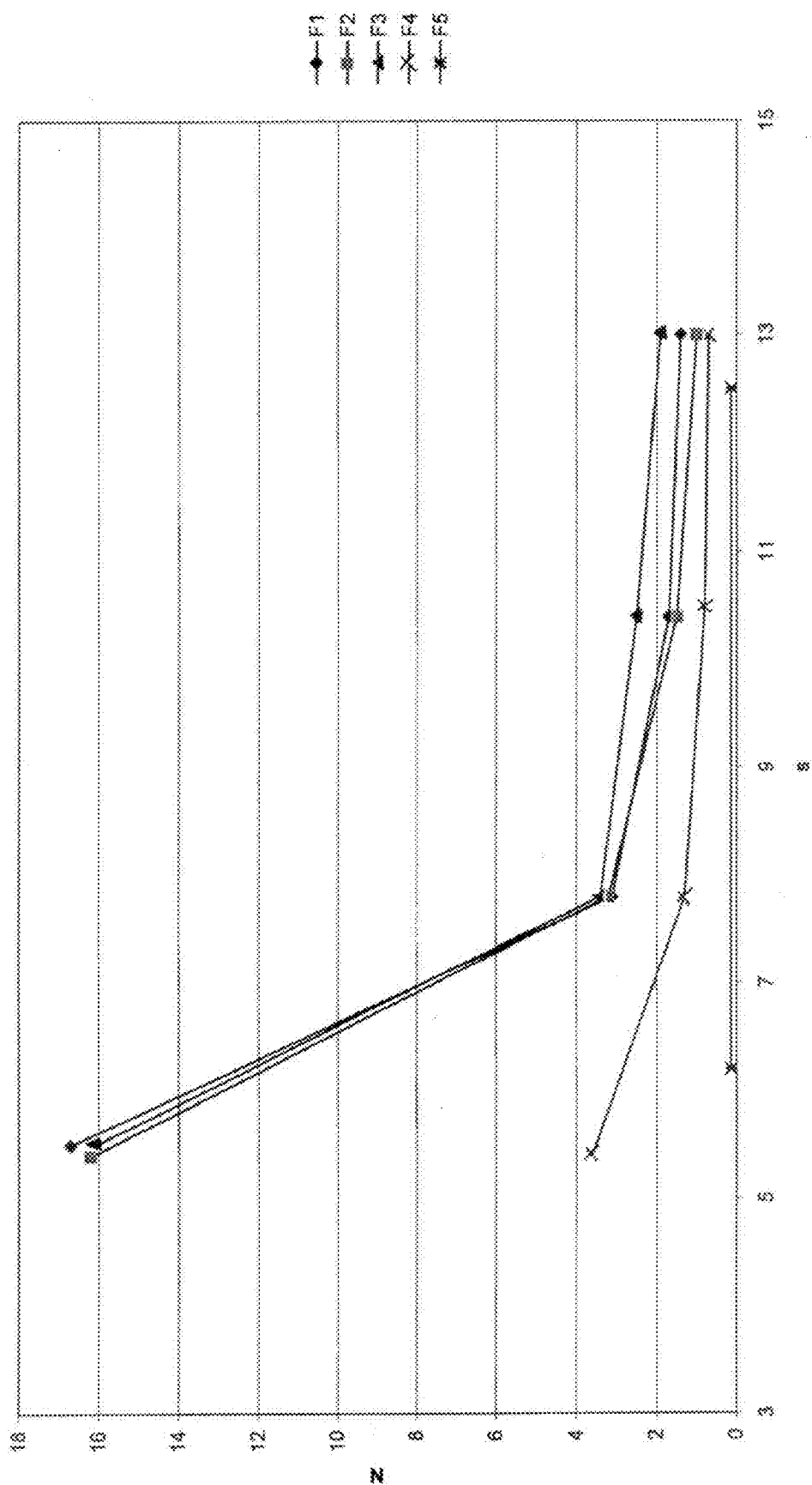
FIG. 1 is a graph of film properties, force (Newtons) vs frost time (sec), necessary for separating layers of test film produced having random copolymer of propylene used as the external layer. Data from Table I in the Example.
Figure 2:
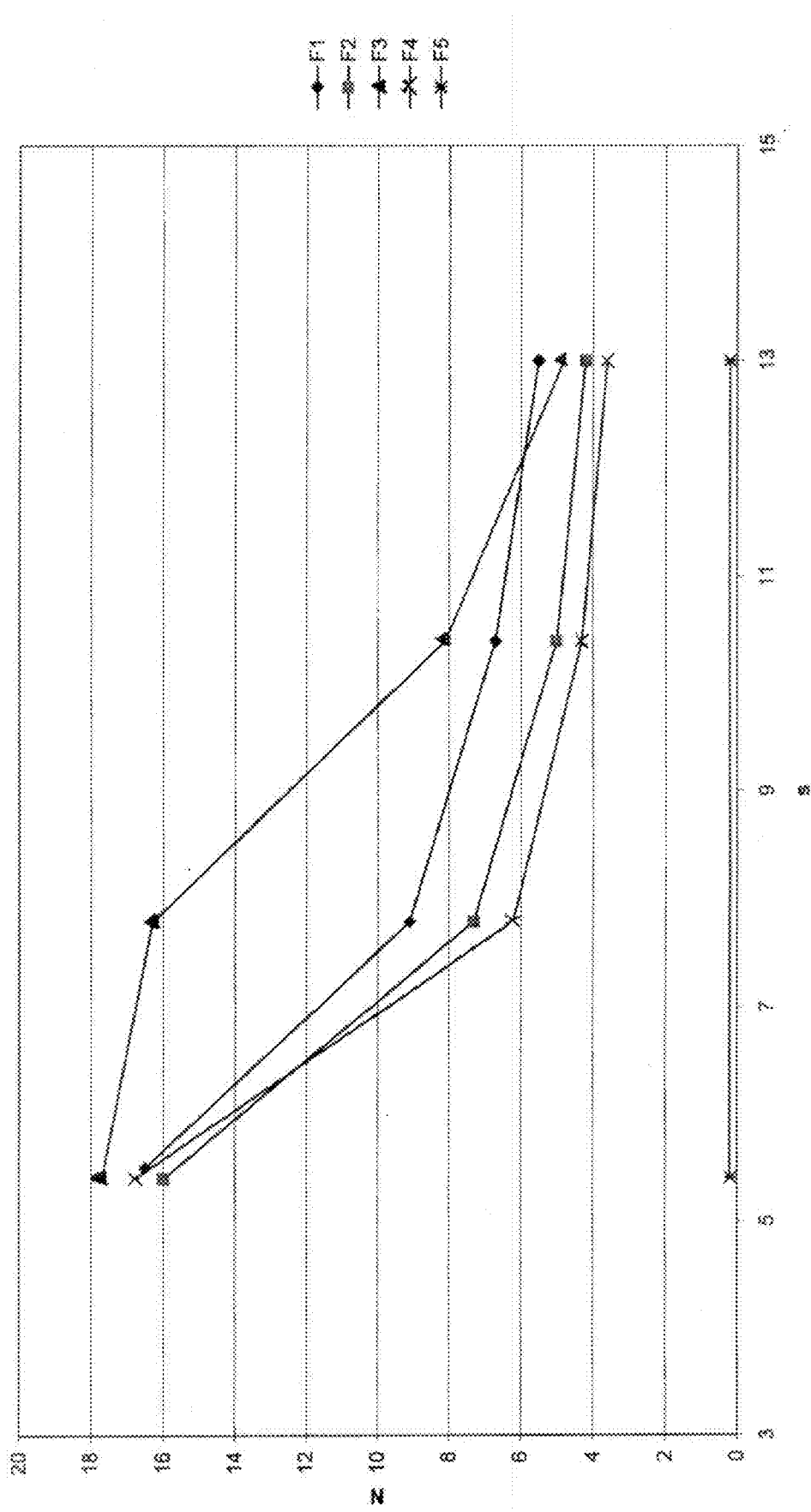
FIG. 2 is a graph of film properties, force (Newtons) vs frost time (sec), necessary for separating layers of test film produced having homopolymer of propylene used as the external layer. Data from Table II in the Example.

In the present invention, a film is defined as an extremely thin continuous sheet: the upper limit for thickness is of about 250 microns (Hawley's Condensed Chemical Dictionary, Twelfth Edition, Rev. by R. J. Lewis, Van Nostrand Reinhold Co., New York).

In the present invention, the term "adjacent" means that the polyethylene layer is adjoining the polypropylene layer without any tie layer.

In the present invention, the term "freezing time of the extrudate" means the time taken by the extrudate for passing from a molten state, when exiting the die, to a crystalline solid state at the frost line.

In the present invention, low density polyethylene (LDPE) produced by high pressure means a LDPE generally produced in autoclave or tubular reactors at pressure above 120 MPa with the use of free-radical initiators. The manufacture of such low density polyethylene is known in the art and is described for example in "Encyclopedia of Polymer Science and Engineering", second edition, Volume 6, on pages 404 to 410.

The polypropylene used in the present can be any polypropylene suitable for the production of films or sheets. It can be a homopolymer or copolymer or terpolymer of propylene prepared with a Ziegler-Natta catalyst system or a physical or chemical blend thereof. Alternatively a polypropylene produced by a metallocene catalyst system can be a homopolymer, a copolymer, being either a random or block copolymer, or terpolymer of isotactic or of syndiotactic polypropylene such as disclosed for example in EP-A-881,236, EP-A-965,603, EP-A-1,010,709 or WO-00/49209.

The polyethylene used in the present invention may be a linear low density polyethylene, a medium density polyethylene or a high density polyethylene.

The polyethylene may be made using any known catalytic process, for example using a chromium oxide based catalyst, a Ziegler-Natta catalyst or a metallocene catalyst.

Chromium oxide based catalysts, Ziegler-Natta catalysts and metallocene catalysts are well known to the skilled person. A Ziegler-Natta catalyst comprises a titanium compound having at least one titanium-halogen bond and an internal electron donor, both on a suitable support (for example on a magnesium halide in active form), an organoaluminium compound (such as an aluminium trialkyl), and an optional external donor.

A metallocene catalyst comprises a metallocene, optionally on a suitable support, an activator, such as an aluminoxane, and optionally a second organoaluminium compound, such as an aluminium trialkyl. The term metallocene used herein means any transition metal complexes consisting of metal atoms bonded to one or more ligands.

A chromium catalyst refers to a catalyst obtained by deposition of chromium oxide on a support, e.g. a silica or aluminium support. Examples of chromium catalysts comprise but are not limited to $CrSiO_2$ or $CrAl_2O_3$.

The polyethylene may have a density of from 0.900 g/cm$^3$ to 0.965 g/cm$^3$, preferably from 0.918 g/cm$^3$ to 0.960 g/cm$^3$, more preferably from 0.923 g/cm$^3$ to 0.950 g/cm$^3$, yet more preferably from 0.923 g/cm$^3$ to 0.940 g/cm$^3$ when measured at 23° C. using the ASTM D 1505 method.

As known in the art, the desired density is obtained by copolymerisation of ethylene with a suitable amount of a comonomer selected from the group consisting of propylene, 1-butene, 1-hexene, 1-octene and 4-methyl-1-pentene, the preferred comonomer being 1-butene, 1-hexene, 1-octene, the most preferable comonomer being 1-hexene.

The melt index of the polyethylene can be regulated by the amount of hydrogen injected in the reactor. The melt index ($MI_2$) of the polyethylene ranges from 0.2 g/10 min to 10 g/10 min, preferably from 0.3 g/10 min to 2 g/10 min when measured according to ASTM D 1238, conditions 190° C./2.16 kg.

The manufacture of the linear low density polyethylenes which may be used in the present invention is known in the art and is described for example in "Encyclopedia of Polymer Science and Engineering", second edition, Volume 6, on pages 436 to 444.

Preferably, the polyethylene used in the present invention is a metallocene catalysed polyethylene. More preferably, the metallocene catalysed polyethylene is produced with a metallocene catalyst having the general formula:

$R(THI)_2MQ_{Z-2}$ wherein

THI is a tetrahydrogenated indenyl group which may be substituted or not,

R is a substituted or unsubstituted $C_1$-$C_4$ alkylidene radical, a dialkyl germanium, a dialkyl silicon, a diaryl silicon, a di-alkoxysilane, a diphenoxysilane, or an alkyl phosphine or amine radical bridging two tetrahydrogenated indenyl groups, Q is a hydrocarbyl radical such as aryl, alkyl, alkenyl, alkylaryl, or arylalkyl radical having from 1-20 carbon atoms, hydrocarboxy radical having 1-20 carbon atoms or halogen and can be the same or different from each other, M is a group 4, 5 or 6 transition metal, and Z is the valence of the transition metal.

Preferably, THI is an unsubstituted tetrahydrogenated indenyl group.

Preferably. M is a group 4 transition metal, more preferably M is zirconium.

Preferably, Q is an alkyl radical having from 1-4 carbon atoms or a halogen, more preferably Q is methyl or chlorine.

Preferably, R is a substituted or unsubstituted $C_1$-$C_4$ alkylidene radical, more preferably ethylidene or isopropylidene.

Preferably, the metallocene catalyst used is a bridged bis(tetrahydro-indenyl) zirconium dichloride, more preferably an ethylene bis(tetrahydro-indenyl) zirconium dichloride.

The metallocene catalyst is used in a polymerisation process according to any method known in the art.

Preferably, the metallocene catalysed polyethylene (mPE) used in the present invention has a monomodal molecular weight distribution. The molecular weight distribution is defined by a parameter, known as the dispersion index (D), which is the ratio between the average molecular weight by weight (Mw) and the average molecular weight by number (Mn). Preferably, the metallocene catalysed polyethylene used in the present invention has a molecular weight distribution of less than 4, preferably between 2 and 3, more preferably between 2.2 to 2.7. The molecular weights are determined by gel permeation chromatography (GPC).

The mPE may also be characterised by a long chain branching structure.

Preferably, the mPE resin used in the present invention has a rheological long—chain branching index, LCBI, such as defined by R. N. Shroff and H. Mavridis in Macromolecules 2001, 34, 7362-7367 by the equation:

$$LCBI = \frac{\eta_0^{0.179}}{4.8\ [\eta]} - 1$$

where $\eta_0$ is the limiting, zero-shear viscosity at 190° C. and [$\eta$] is the intrinsic viscosity in trichlorobenzene at 135° C.

The LCBI is calculated from the best fitting by least squares analysis of the rheological curve (complex viscosity versus frequency) as described in U.S. Pat. No. 6,114,486 with the following generalized Cross equation, i.e. $\eta = \eta_0/(1+(\gamma t_0)^n)$ wherein n is the power law index of the material characterizing the shear thinning behaviour of the material, $t_0$ is the characteristic relaxation time of the material, $\eta_0$ is the zero-shear viscosity, $\eta$ and $\gamma$ are the measured viscosity and shear rate data respectively. The dynamic rheological analysis is performed at 190° C. under nitrogen and the strain amplitude is 10%. Results are reported according to ASTM D 4440.

Preferably, the LCBI of the mPE used in the present invention is at least greater than 0.14, more preferably greater than 0.50, even more preferably greater than 1, most preferably greater than 2.

The multilayer film is produced by a coextrusion blown process.

In the coextrusion blown process, the molten polymers are extruded through a multi-chanel annular die to form a tubular film also known as a "bubble". Air is injected into the interior of the bubble to inflate it to a desired diameter. The bubble is pulled through a collapsing frame by nip rollers, which flatten the bubble to a film.

As the bubble travels upward from the die face in the molten state, it is cooled and reaches a temperature where it becomes a solid. The distance from the die face to where the solidification takes place is called the frost-line height. At this height, the film is "optically frosting" as it becomes cloudy due to polymer crystallisation. Conventionally, the frost line is defined as the lowest point where the bubble is at its maximum diameter because there is effectively no further stretching above this point. In a coextrusion film process, several frost lines may be present, one for each layer of the film. In the invention, the frost line of a coextruded film is the frost line of the layer that freezes first.

The time taken by the extrudate for passing from a molten state, when exiting the die, to a crystalline solid state at the frost line is called the "freezing time of the extrudate".

When the bubble begins its expansion almost immediately above the die face, thus almost without any neck" also known in the art as "pocket bubble" or still as "LDPE configuration", the freezing time of the extrudate (Ft), expressed in seconds, may be defined by the following formula:

$$Ft = \frac{Fh \ln\left(\frac{Vf}{Vo}\right)}{Vf - Vo}$$

wherein

Fh (m) is the frost line height, ln is the logarithmic function,

Vf (m/s) is the velocity of the web as it goes through the nip rollers. It is also known as the film drawn speed, which determines the thickness of the film.

Vo (m/s) is the melt output speed also known as the initial velocity of the polymer as it exits the die gap. Vo is function of the density of the melt, of the die output and of the surface of the die. Vo is calculated according the formula:

$$V_O = \frac{Q}{(dS)}$$

wherein

Q (kg/s) is the output flow rate d (kg/m$^3$) is the density of the melt

S (m$^2$) is the surface by which the polymer exits the die.

Knowing the film drawn speed (Vf), the melt output speed (Vo) and the desired freezing time of the extrudate (Ft), the height of the frost line (Fh) is then determined according to the above formula.

Bubble cooling is generally accomplished by blowing a large volume of air on the film as it exits the die. This may take place on only the outside of the bubble or on both the inside and the outside of the bubble. In order to get the right frost line height and thus the desired freezing time of the extrudate, the skilled man in the art may adjust the cooling of the bubble, by regulating the temperature and/or the speed at which the air impinges on the bubble.

The frost line may be determined visually as at this point, the film becomes cloudy.

The measurement of the frost-line height is generally done manually with a tape measure.

The film is produced such that the freezing time of the extrudate is less than 10 seconds, preferably less than 9 seconds, more preferably less than 8 seconds, even more preferably less than 7 seconds, most preferably less than 6 seconds.

When there are more than two layers, according to one embodiment, the polypropylene layer can be the internal layer of a film or sheet wherein the external layer is polyethylene. According to another embodiment, the polypropylene layer can be the external layer of a film or sheet wherein the internal layer is polyethylene.

For each embodiment, the films or sheets have simultaneously high rigidity and good sealing properties.

The invention further provides the blown films or sheets produced by the process according to the invention. The films or sheets produced show a good adhesion between the polyethylene and polypropylene without requiring any tie layer. This is particularly surprising, as it was believed that polypropylene and polyethylene poorly adhere to each other.

The blown films or sheets according to the invention are characterised by an adhesion between a polyethylene layer and a polypropylene layer, which is at least 10 percent, preferably at least 20 percent, more preferably at least 50 percent, yet more preferably at least 100 percent, most preferably at least 200 percent higher than an adhesion between a polyethylene layer and a polypropylene layer of an identical film produced by the same coextrusion process under the same conditions except that the freezing time is higher or equal to 11 seconds, the adhesion being measured with a dynamometer at a speed of 200 mm/min at room temperature.

EXAMPLES

1. Materials

The following resins were used in the process according to the invention:

A metallocene polyethylene resin hereinafter "R1" having a density of 0.923 g/cm$^3$ and a MI$_2$, of 0.9 g/10 min.

A metallocene polyethylene resin hereinafter "R2" having a density of 0.927 g/cm$^3$ and a MI$_2$, of 0.9 g/10 min A metallocene polyethylene resin hereinafter "R3" having a density of 0.934 g/cm$^3$ and a MI$_2$, of 0.9 g/10 min.

Resins R1, R2 and R3 were all prepared by using the bridged metallocene ethylene bis(4,5,6,7,tetrahydro-1-indenyl) zirconium dichloride. Said catalyst was activated and supported.

A commercially available Ziegler-Natty catalysed linear low-density polyethylene sold under the name Dowlex® 2049E and identified hereinafter "R4". Dow 2049E has a density of 0.926 g/cm$^3$ and a MI$_2$ of 1.0 g/10 min.

A commercially available low-density polyethylene sold by Total Petrochemicals under the reference 1008FE24 and identified hereinafter "R5" having a density of 0.924 g/cm$^3$ and a MI$_2$ of 0.8 g/10 min. This resin is prepared with peroxide under a high-pressure process.

A commercially available polypropylene sold by Total Petrochemicals under the reference PPH3060 and identified hereinafter "R6". It is a homopolymer of propylene produced with a Ziegler-Natta catalyst having a density of 0.905 g/cm3 and a MI2 of 1.8 g/10 min.

A commercially available polypropylene sold by Total Petrochemicals under the reference PPR3260 and identified hereinafter "R7". It is a random copolymer of propylene produced with a Ziegler-Natta catalyst having a density of 0.902 g/cm3 and a MI2 of 1.8 g/10 min.

2. Film Preparation

Five blown coextruded five-layers A/A/B/C/C films (hereinafter F1 to F5) were prepared and characterised by:
i) two identical layers (layers A) made either of homopolymer of propylene (R6) or random copolymer of propylene (R7). The total thickness of both layers A is 50 μm.
ii) one core layer (layer B) consisting of one of the fifth polyethylene resin such as defined under point 1. The thickness of layer B is 10 μm.
iii) two identical layers (layers C) made of polyethylene resin R3. The total thickness of both layers C is 70 μm.

The total thickness of each film is 130 μm.

The films were blown on blown film line equipment using a low density configuration characterised by a die diameter of 50 mm, a blow up ratio of 2.5, no neck and a die gap of 1.4 mm.

The cooling of the bubble was made by air, which was at room temperature, only at the outside of the bubble at a rate of 12 kg/h.

3. Film Properties

The adhesion between the polypropylene layer and the core polyethylene layer was measured by the force (in Newtons) necessary for separating those layers. This was measured with a dynamometer at a speed of 200 mm/min at room temperature. The results are based upon an average of 3 samples.

The results are displayed in table I when random copolymer of propylene is used as external layer and in table II when homopolymer of propylene is used as external layer. The results of tables I and II have been respectively plotted in FIGS. I and II.

TABLE I

| Film | Layer B composition | Frost time (seconds) | Force (Newtons) |
|---|---|---|---|
| F1 | R1 | 5.5 | 16.7 |
|  |  | 7.8 | 3.1 |
|  |  | 10.4 | 1.7 |
|  |  | 13.0 | 1.4 |

TABLE I-continued

| Film | Layer B composition | Frost time (seconds) | Force (Newtons) |
|---|---|---|---|
| F2 | R2 | 5.4 | 16.2 |
|  |  | 7.8 | 3.2 |
|  |  | 10.4 | 1.5 |
|  |  | 13.0 | 1.0 |
| F3 | R3 | 5.5 | 16.1 |
|  |  | 7.8 | 3.4 |
|  |  | 10.4 | 2.5 |
|  |  | 13.0 | 1.9 |
| F4 | R4 | 5.4 | 3.6 |
|  |  | 7.8 | 1.3 |
|  |  | 10.5 | 0.8 |
|  |  | 13.0 | 0.7 |
| F5 | R5 | 6.2 | 0.14 |
|  |  | 12.5 | 0.14 |

TABLE II

| Film | Layer B (composition) | Frost time (seconds) | Force (Newtons) |
|---|---|---|---|
| F1 | R1 | 5.5 | 16.5 |
|  |  | 7.8 | 9.1 |
|  |  | 10.4 | 6.7 |
|  |  | 13.0 | 5.5 |
| F2 | R2 | 5.4 | 16.0 |
|  |  | 7.8 | 7.3 |
|  |  | 10.4 | 5.0 |
|  |  | 13.0 | 4.2 |
| F3 | R3 | 5.4 | 17.7 |
|  |  | 7.8 | 16.3 |
|  |  | 10.4 | 8.1 |
|  |  | 13.0 | 4.8 |
| F4 | R4 | 5.4 | 16.8 |
|  |  | 7.8 | 6.2 |
|  |  | 10.4 | 4.3 |
|  |  | 13.0 | 3.6 |
| F5 | R5 | 5.4 | 0.2 |
|  |  | 13.0 | 0.2 |

The invention claimed is:

1. A process for producing a multi-layer film or sheet containing at least one polyethylene layer adjacent to at least one polypropylene layer comprising:
   feeding polypropylene to a first extruder of an coextrusion film unit;
   feeding polyethylene to a second extruder of the coextrusion film unit;
   coextruding the polypropylene and the polyethylene through a die to form a molten extrudate;
   blowing the molten extrudate into a film; and
   cooling the film to form a multi-layer film, wherein a freezing time of the extrudate is less than 10 seconds and the polyethylene is not a low density polyethylene produced by a high pressure polymerisation process,
   wherein the polyethylene is produced with a metallocene catalyst having the general formula:

$R(THI)_2MQ_{Z-2}$ wherein THI is a tetrahydrogenated indenyl group which may be substituted or not, R is a substituted or unsubstituted $C_1$-$C_4$ alkylidene radical, a dialkyl germanium, a dialkyl silicon, a diaryl silicon, a di-alkoxysilane, a diphenoxysilane, or an alkyl phosphine or amine radical bridging two tetrahydrogenated indenyl groups, Q is a hydrocarbyl radical, hydrocarboxy radical having 1-20 carbon atoms or halogen and can be the same or different from each other, M is a group 4, 5 or 6 transition metal, and Z is the valence of the transition metal.

2. The process of claim 1, wherein the freezing time of the extrudate is less than 9 seconds.

3. The process of claim 1, wherein the freezing time of the extrudate is less than 8 seconds.

4. The process of claim 1, wherein the freezing time of the extrudate is less than 7 seconds.

5. The process of claim 1, wherein the freezing time of the extrudate is less than 6 seconds.

6. The process of claim 1, wherein M is a group IVb transition metal.

7. The process of claim 1, wherein M is zirconium.

8. The process of claim 1, wherein R is a substituted or unsubstituted $C_1$-$C_4$ alkylidene radical.

9. Films or sheets obtainable by the process of claim 1.

* * * * *